United States Patent [19]
Wians

[11] Patent Number: 5,564,721
[45] Date of Patent: Oct. 15, 1996

[54] COUPLING MECHANISM FOR A SULKY

[75] Inventor: Jeff Wians, Mebane, N.C.

[73] Assignee: Honda Giken Kogyo Kabushiki Kaisha, Tokyo, Japan

[21] Appl. No.: 280,810

[22] Filed: Jul. 26, 1994

[51] Int. Cl.$^6$ .................................................. B62D 63/00
[52] U.S. Cl. ................ 280/32.7; 180/19.1; 56/DIG. 14; 280/493; 280/497
[58] Field of Search .................. 180/19.1, 19.2, 180/19.3, 11, 12; 280/32.7, 443, 461.1, 492, 493, 494, 495, 497; 56/DIG. 10, DIG. 14, 13.5, 14.9, 15.7

[56] References Cited

U.S. PATENT DOCUMENTS

| | | | |
|---|---|---|---|
| 2,100,447 | 11/1937 | Mahaffey | 280/443 |
| 2,740,462 | 4/1956 | Stegeman | 280/32.7 |
| 3,190,672 | 6/1965 | Swanson et al. | 280/32.7 |
| 4,192,525 | 3/1980 | Clark | 280/443 |
| 4,998,948 | 3/1991 | Osterling | 56/12.6 |
| 5,245,771 | 9/1993 | Walsh | 280/461.1 X |

FOREIGN PATENT DOCUMENTS

| | | | |
|---|---|---|---|
| 195165 | 5/1957 | Germany | 56/DIG. 10 |
| 638436 | 4/1962 | Italy | 280/32.7 |
| 40-15927 | 7/1965 | Japan . | |

*Primary Examiner*—Kevin T. Hurley

[57] ABSTRACT

A coupling mechanism for operatively connecting a sulky to a motorized vehicle. The sulky includes a support platform including a seat for an operator secured thereto and at least one wheel operatively, rotatably connected to the support platform. A hitch point is provided to be connected to a motorized vehicle. An upper support member includes a first end pivotally connected to the hitch point and a distal end extending a predetermined distance therefrom and being pivotally connected to the support platform. A lower support member includes a first end pivotally connected to the support platform and a distal end extending towards and being pivotally connected to the hitch point. The hitch point, upper support member and lower support member are operatively connected together for adjusting the disposition of a sulky relative to a motorized vehicle during the traversing of a crest in terrain and a ravine in terrain.

17 Claims, 8 Drawing Sheets

—— ORIGINAL SULKY HITCHING POSITION
- - - MACHINE ROTATED 10 DEGREES (CRESTING A HILL)
-·-·- MACHINE ROTATED 16 DEGREES (OPERATION IN A RAVINE)

COUPLING MECHANISM FOR A SULKY

BACKGROUND OF THE INVENTION

1. Field of the Invention

The present invention is directed to a coupling mechanism for operatively connecting a sulky to a motorized vehicle, in particular, to a zero turn walk behind commercial mower. The coupling mechanism controls the tilting of the seat of the sulky during the traversing of a crest or ravine to position the user of the sulky in a proper position for controlling the motorized vehicle.

2. Description of Background Art

Many sulkies for attachment to a motorized vehicle are commercially available. One such motorized vehicle is a zero turn mower which has the ability to lock one of the drive wheels and pivot about the locked wheel so that the turning radius is zero. The available sulkies articulate about a vertical axis extending through the sulky hitch. In addition, the sulkies pitch about a transverse horizontal axis that contains the hitch. Further, the sulkies roll about a longitudinal horizontal axis that contains the hitch. This articulation is necessary so that grass being cut by the mower is cut at a substantially constant height regardless of the ground contour. This freedom of movement is sometimes not comfortable or convenient for the operator. During the traversing of a crest or ravine, the operator may not be conveniently positioned relative to the controls of the motorized vehicle. A conventional sulky may roll from one side to the other as the mower traverses uneven ground and/or is subjected to quick turns.

An operator positioned on a sulky may cause the motorized vehicle to become inclined relative to the sulky merely by his/her weight. The seat of a conventional sulky is normally located behind the wheel axle of the sulky. This will cause the motorized vehicle to pivot upwardly or downwardly about the hitch point depending upon the weight of the operator. Static forces are produced based on the application of the weight of the operator on the sulky. In addition, dynamic forces applied to the sulky by the operator may affect the position of the motorized vehicle relative to the sulky. This may occur when the sulky and motorized vehicle are traveling up a hill. If the operator applies a downward force to the foot rest of the sulky in order to increase the traction of the rear wheels of the motorized vehicle, this causes the front end of the mower to lift up and decreases the distance between the operator and the mower controls.

During a condition wherein the motorized vehicle is cresting a hill, the angle formed between the sulky and the motorized vehicle increases the distance between the operator and the motorized vehicle controls. This amount of backward pitch permitted by a conventional sulky may displace the controls beyond the normal reach of the operator. This would cause the operator to stretch uncomfortably in order to reach the controls. In addition, the seat tilts rearwardly and extends the distance the operator must reach for the controls.

Figure 4:
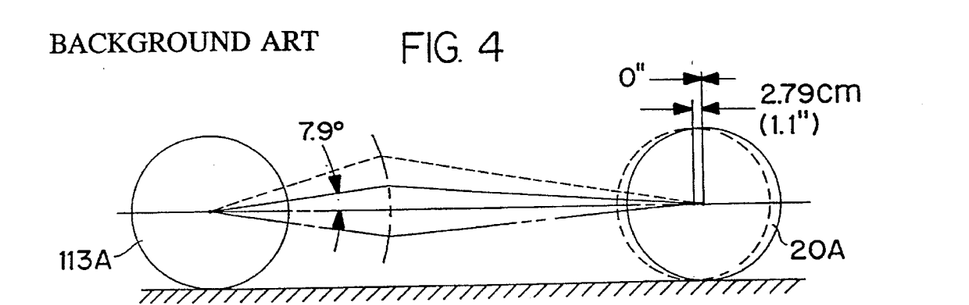
FIG. 4 illustrates a schematic view of the wheel positioning of a Brand A sulky wherein the solid line illustrates the original sulky hitching position, the dash lines illustrate the sulky rotated ten degrees during the cresting of a hill and the discontinued lines illustrates the sulky rotated sixteen degrees during the traversing of a ravine.
Figure 5:
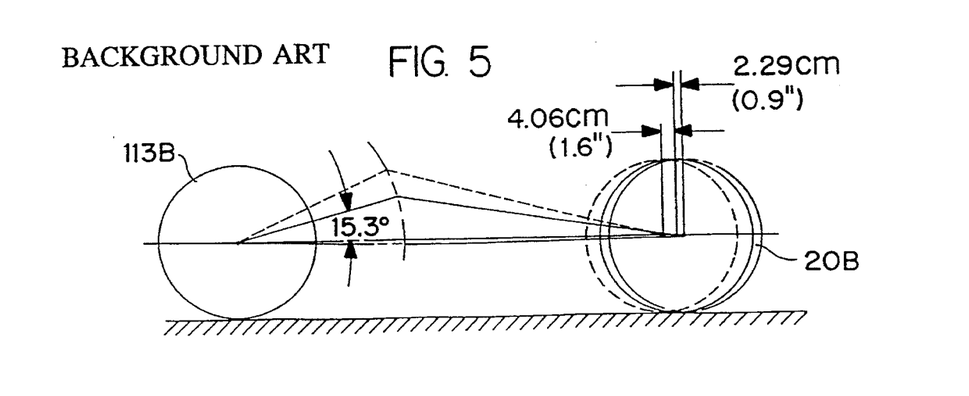
FIG. 5 illustrates a schematic view of the wheel positioning of a Brand B sulky wherein the solid line illustrates the original sulky hitching position, the dash lines illustrate the sulky rotated ten degrees during the cresting of a hill and the discontinued lines illustrates the sulky rotated sixteen degrees during the traversing of a ravine.

The primary factor which controls the amount of articulation, pitch and roll of a sulky is the location of the hitch point on the motorized vehicle. FIGS. 4 and 5 schematically illustrate the location of the hitch points of conventional Brand A and Brand B sulkies. As illustrated in FIG. 4, a relatively small angle of 7.9 degrees is provided between the two solid lines which represent the horizontal and the radial distance from the wheel center of the conventional hitch assembly for a sulky. When the sulky illustrated in FIG. 4 is cresting a hill, the wheels 20A of the sulky are moved 2.79 centimeters or 1.1 inches towards the wheels 113A of the motorized vehicle. When the sulky illustrated in FIG. 4 is traversing a ravine, the wheels 20A of the sulky are not moved towards or away from the wheels 113A of the motorized vehicle. The fact that the wheels of the sulky are not linearly displaced a sufficient distance relative to the control handles of the motorized vehicle will result in the operator of the sulky being too close or too far from the control handles as the motorized vehicle traverses a ravine or traverses a crest of a hill.

As illustrated in FIG. 5, a relatively small angle of 15.3 degrees is provided between the two solid lines which represent the horizontal and the radial distance from the wheel center of the conventional hitch assembly for a sulky. When the sulky illustrated in FIG. 5 is cresting a hill, the wheels 20B of the sulky are moved 4.06 centimeters or 1.6 inches towards the wheels 113A of the motorized vehicle. When the sulky illustrated in FIG. 4 is traversing a ravine, the wheels 20A of the sulky are moved 2.29 centimeters or 0.9 inches away from the wheels 113A of the motorized vehicle. Again, the fact that the wheels of the sulky are not linearly displaced a sufficient distance relative to the control handles of the motorized vehicle will result in the operator of the sulky being too close or too far from the control handles as the motorized vehicle traverses a ravine or traverses a crest of a hill.

The design objective of the conventional sulky hitch points is to locate the hitch point as close to the horizontal plane containing the drive wheel axis as possible. This allows the towing force applied to the sulky to approach a maximum and reduces the effects of the towing forces on reducing the drive wheel traction.

Conventional sulky hitches are specifically designed to minimize the angular and radial distances. This minimization allows little or no longitudinal displacement of the sulky relative to the mower as the sulky pitches forward and backward.

The conventional sulkies create a sense of lateral instability when subjected to either uneven ground, high friction surfaces and/or exiting from a zero turn application. There are two factors which dictate lateral stability, the maximum roll of the sulky and the location of the footrests relative to the stability triangle of the sulky. The stability triangle is defined by a triangle formed by the center of each sulky wheel and the hitch point. A force applied within the stability triangle will not generate a moment which would cause the sulky to roll to the side of the applied force. A force applied outside of this stability triangle will create a moment and cause the sulky to roll towards the side on which the force acts.

Conventional sulkies permit about 25.4 centimeters or 10 inches of vertical displacement or approximately 15.5 degrees of roll. This amount of roll is a function of the type of hitch, e.g., ball joint, and the tolerance or play between the hitch components. This large roll angle may be inconvenient for the operator. During a high speed operation, this roll angle will add to a sense of instability due to the increased lateral acceleration on the operator.

The large rolling displacement permitted by the conventional sulky may not easily be countered by the operator. The operator may attempt to correct this situation by applying a force to the footrest that has tilted upwardly. However, this force will have little or no effect to regain equilibrium of the sulky because the force may be applied within or substantially adjacent a side of the stability triangle. Either no moment will be generated or the moment caused by this force will be insufficient to roll the sulky in the opposite direction and equilibrium will not be regained.

SUMMARY AND OBJECTS OF THE INVENTION

It is an object of the instant invention to provide a simple and economical coupling mechanism for connecting a sulky to a motorized vehicle that will increase the stability of the sulky and the performance of the motorized vehicle.

It is another object of the invention to provide a coupling mechanism for a sulky which will prevent the controls of the motorized vehicle from being moved from a position which would not provide a comfortable reach for the operator. During the cresting of a hill, the wheels of the sulky are moved towards the wheels of the motorized vehicle so as to maintain a proper distance between the operator of the sulky and the controls of the motorized vehicle.

It is a further object of the invention to provide a coupling mechanism for increasing lateral stability of the sulky under all operating conditions.

A still further object of the invention is to provide a coupling mechanism for permitting the operator to actively increase the lateral stability of the sulky.

It is another object of the invention to enhance the overall stability of the sulky and the traction of the drive wheels of the motorized vehicle when the sulky is subjected to forces applied by the operator.

Another object of the invention is to prevent the operator from becoming too close to the controls of the motorized vehicle. During the traversing of a ravine, the wheels of the sulky are moved away from the wheels of the motorized vehicle so as to maintain a proper distance between the operator of the sulky and the controls of the motorized vehicle.

These and other objects of the present invention are achieved by providing a coupling mechanism for operatively connecting a sulky to a motorized vehicle. The sulky includes a support platform having a seat for an operator secured thereto and at least one wheel operatively, rotatably connected to the support platform. The coupling mechanism includes a hitch point adapted to be connected to the motorized vehicle. An upper support member includes a first end pivotally connected to the hitch point and a distal end extending a predetermined distance therefrom and being pivotally connected to the support platform. A lower support member includes a first end pivotally connected to the support platform and a distal end extending towards and being pivotally connected to the hitch point. The hitch point, upper support member and lower support member being operatively connected together for adjusting the disposition of a sulky relative to a motorized vehicle during the traversing of a crest in terrain and a ravine in terrain.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
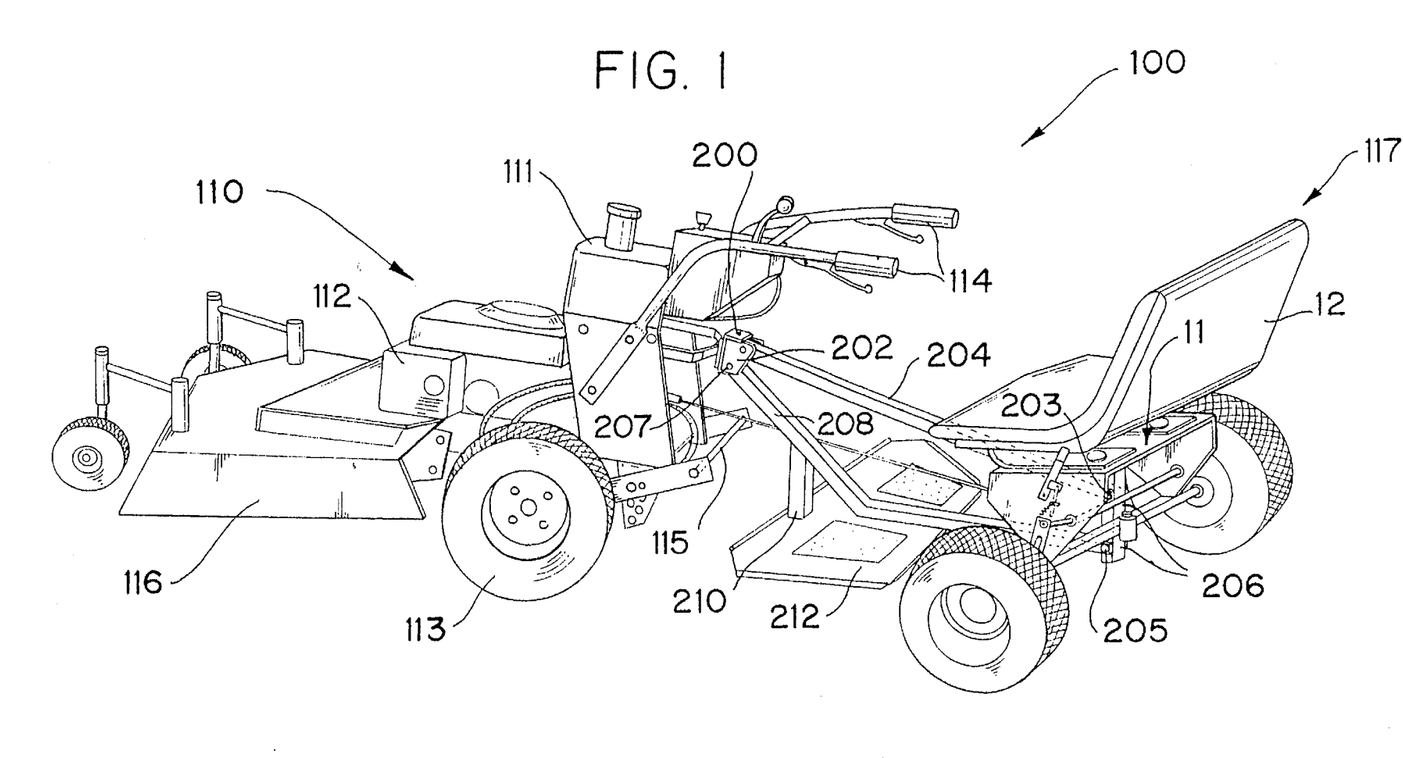
FIG. 1 is a perspective view illustrating a two-wheel tractor provided with a sulky mounted at the rear thereof.

As illustrated in FIG. 1, a lawnmower sulky device 100 includes a motorized vehicle 110 having a housing 111 and a motor and transmission assembly 112. The motorized vehicle 110 could be a two-wheeled tractor which will be referred to hereinafter. Wheels 113 are operatively connected to the motor and transmission assembly 112 for imparting motion to the two-wheeled tractor 110. Control handles 114 are operatively mounted relative to the housing 111 for actuating the motor and transmission assembly 112. A control lever 115 is operatively connected to a lawnmower cutting device 116 for manually raising and lowering the lawnmower cutting device 116.

Figure 2:
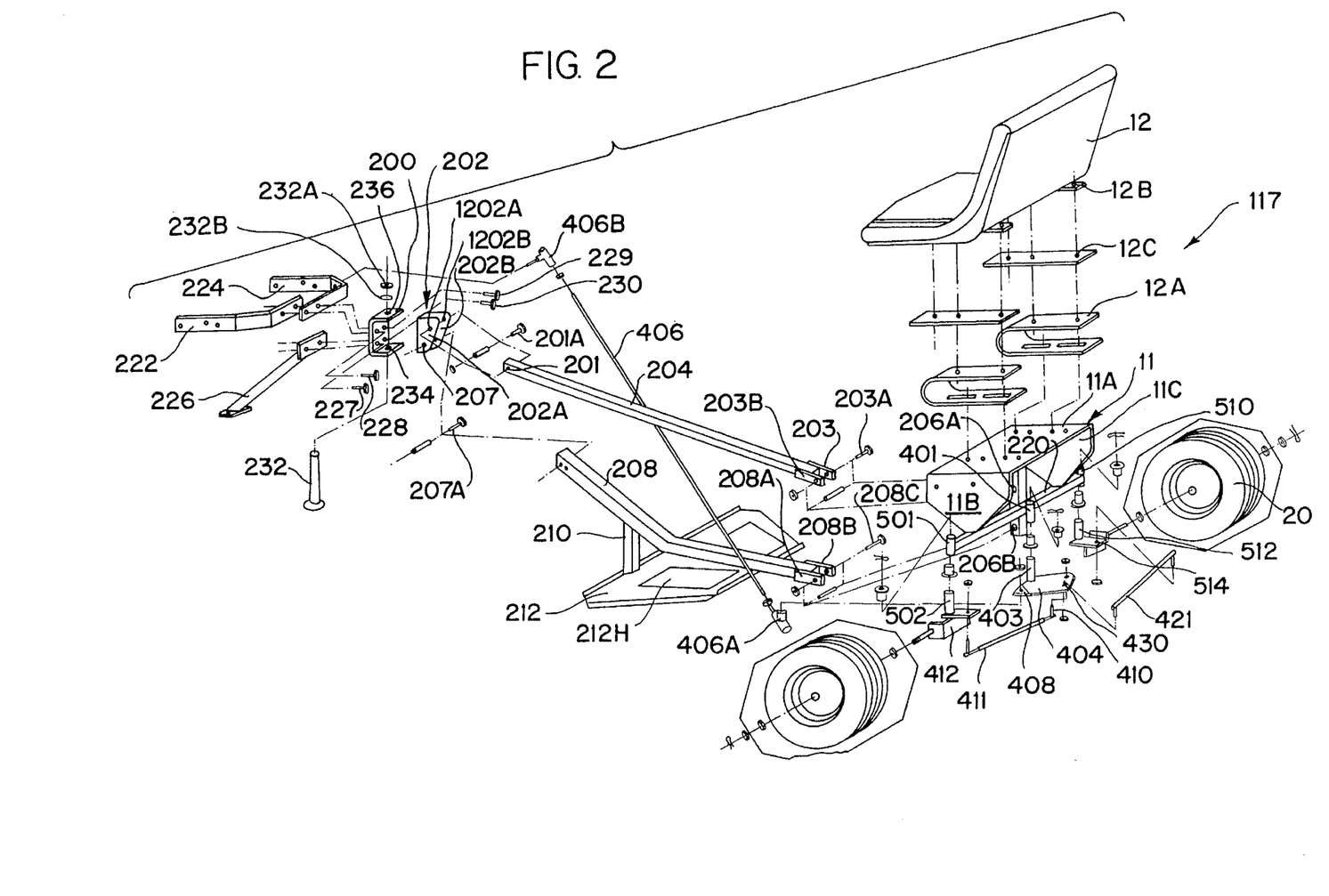
FIG. 2 is an exploded view of a sulky mounting structure according to a first embodiment of the present invention.

A sulky 117 is provided which includes a seat 12 operatively mounted on a platform 11. Two rotatable and steerable wheels 20 are secured to the platform 11. As illustrated in FIGS. 1 and 2, the sulky 117 is operatively connected to the two-wheeled tractor 110 by means of a coupling mechanism. A bracket or hitch point 202 includes two substantially parallel plates 202A and 202B secured to the bracket 200. The bracket 200 is secured to the two-wheeled tractor 110 by means of mounting bars 222, 224 and 226. Bolts 227, 228, 229 and 230 secure the mounting bracket 200 to the mounting bars 222, 224 and 226. A shaft 232 is disposed through apertures. 234 and 236 in the bracket 200 for pivotally mounting the hitch point 202 relative to the bracket 200.

An upper support member 204 is pivotally mounted at 201 to the hitch point 202 by means of a sleeve, shaft and nut assembly 201A mounted within apertures 1202A and 1202B positioned in the parallel plates 202A and 202B. The pivot assemblies of the present invention may be a nut, bolt and sleeve assembly or a pin, washer and cotter pin assembly or any other similar assembly for providing a hinged joint. The upper support member 204 extends rearwardly to a distal end 203 which includes a yoke 203B which is operatively, pivotally connected to a support member 206. The support member 206 is affixed to the platform 11 and includes apertures 206A and 206B. The aperture 206A is designed to receive a sleeve, bolt and nut assembly 203A for securing the end 203 of the upper support member 204 to the support member 206.

A lower support member 208 is pivotally connected at 207 by means of a sleeve, bolt and nut assembly 207A to the hitch point 202 and extends rearwardly therefrom. A second end 208A of the lower support member 208 includes a yoke 208B which is operatively, pivotally connected to the aperture 206B positioned in the support member 206. The aperture 206B is designed to receive a sleeve, bolt and nut assembly 208C for securing the yoke 208B of the lower support member 208 to the support member 206.

A platform 212, for positioning an individual's feet during use of the sulky 117, is connected to the lower support member 208 by means of a support 210. The arrangement of the hitch point, the upper support member, the support member connected to the platform 11 and the lower support member permits the positioning of the seat 12 of the sulky 117 to be moved towards the control lever 115 of the two-wheeled tractor 110 during the cresting of a hill and moved away from the control lever 115 of the two-wheeled tractor 110 during the traversing of a ravine. In this way the orientation of an operator of the sulky is maintained in a predetermined orientation to ensure the comfort of an operator seated on the sulky during use thereof.

As illustrated in FIG. 2, the seat 12 is affixed to the platform 11. The platform 11 includes an upper wall 11A with two downwardly projecting walls 11B and 11C secured to side portions thereof. An axle support 220 extends between and is secured to end portions of the downwardly projecting walls 11B and 11C. The support member 206 is affixed to a bottom surface of the upper wall 11A of the platform 11 and to a central portion of the axle support 220. A spring 12A is secured to a bracket 12B and a plate 12C for operatively positioning the spring 12A between the upper wall 11A of the platform 11 and the seat 12 to provide an individual positioned on the sulky with a cushion for the ride during use of the sulky 117.

As illustrated in FIG. 2, the axle support 220 extending between the downwardly projecting walls 11B and 11C, includes a bearing housing 401 which is secured to approximately the central portion of the axle support 220. A shaft 403 is positioned within the bearing housing 401 for supporting a steering plate 404. Bearing housings 501 and 510 are secured to end portions of the axle support 220. Shafts 502 and 512 are positioned within the bearing housings 501 and 510, respectively, for mounting wheel supports 412 and 514, respectively.

An actuating rod 406 is secured at a first end 406A to the steering plate 404 at a pivot joint 408. A second end 406B of the actuating rod 406 is secured to the mounting bar 224 which is affixed to the two-wheeled tractor 110. Steering rods 411 and 421 are pivotally mounted at 410 and 430 to the steering plate 404, respectively, for imparting movement from the steering plate 404 to the mounting wheel supports 412 and 514, respectively.

Figure 3:
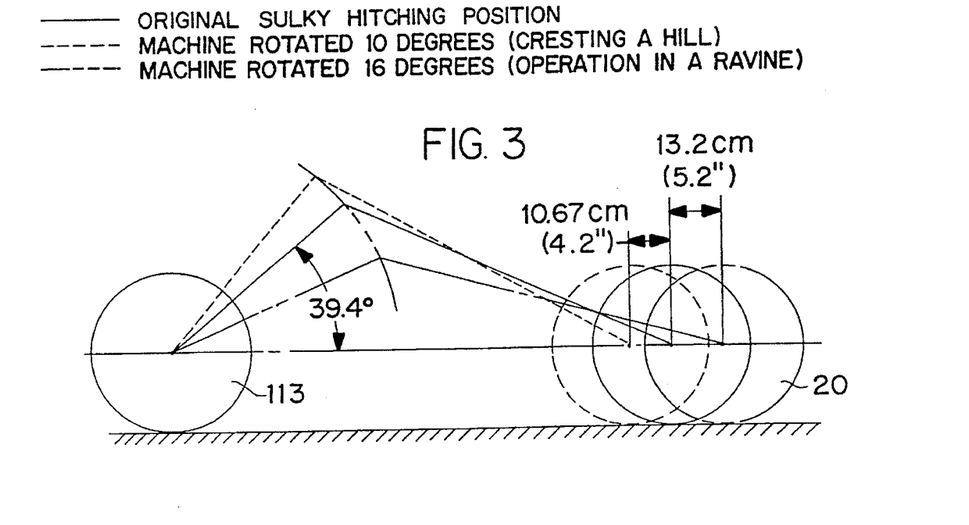
FIG. 3 illustrates a schematic view of the wheel positioning of a sulky according to the present invention wherein the solid line illustrates the original sulky hitching position, the dash lines illustrate the sulky rotated ten degrees during the cresting of a hill and the discontinued lines illustrate the sulky rotated sixteen degrees during the traversing of a ravine.

FIG. 3 shows schematically the hitch point of the present invention. The location of the apertures 207 and 1202A on the hitch point 202 when mounted on the bracket 200 is chosen based upon the radial distance from the drive wheel 113 of the two-wheel tractor 110 and the angle formed between a horizontal line and the line connecting the wheel center and the hitch point 202. The hitch point 202 follows an arcuate path defined by the radius which connects the hitch point 202 and the drive wheel axis. The location of the apertures 207 and 1202A determine how much the operator will be displaced relative to the two-wheel tractor 110 when the two-wheel tractor traverses a change in grade. The greater the hitch point angle, the more the sulky 117 will be displaced longitudinally. An angular displacement within the range of about 20–70 degrees provides sufficient longitudinal displacement of the sulky to ensure a convenient location of an operator relative to the control handles 114 without adversely affecting the drive wheel traction. The preferred embodiment of the invention locates the apertures 207 and 1202A at an angle of approximately 39.4 degrees. As illustrated in FIG. 3, this angle generates approximately 23.88 centimeters or 9.4 inches of total forward and backward linear displacement of the sulky 117.

Figure 6:
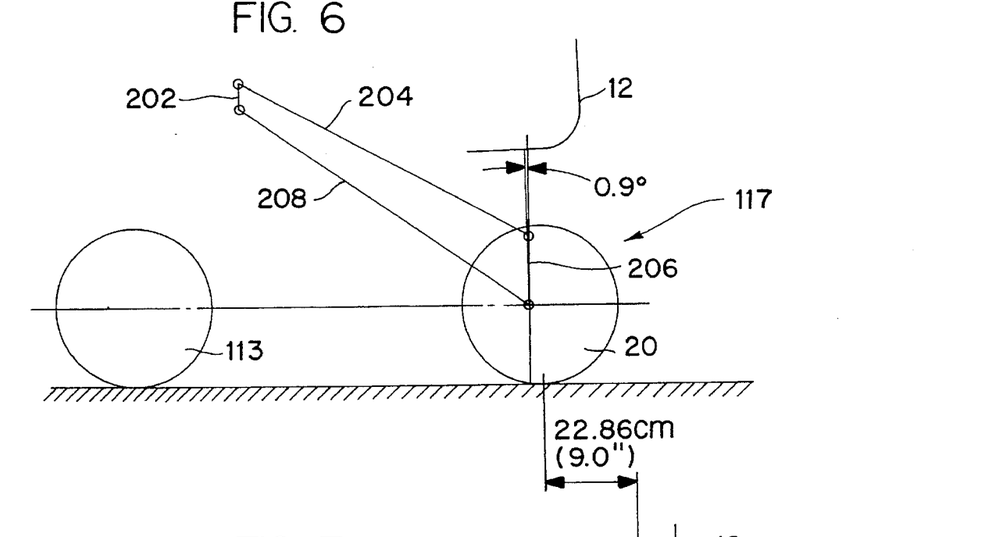
FIG. 6 is a schematic view of the present invention illustrating the seat position of the sulky relative to horizontal when the sulky is pitched backwards, by twenty degrees, during the cresting of a hill.
Figure 7:
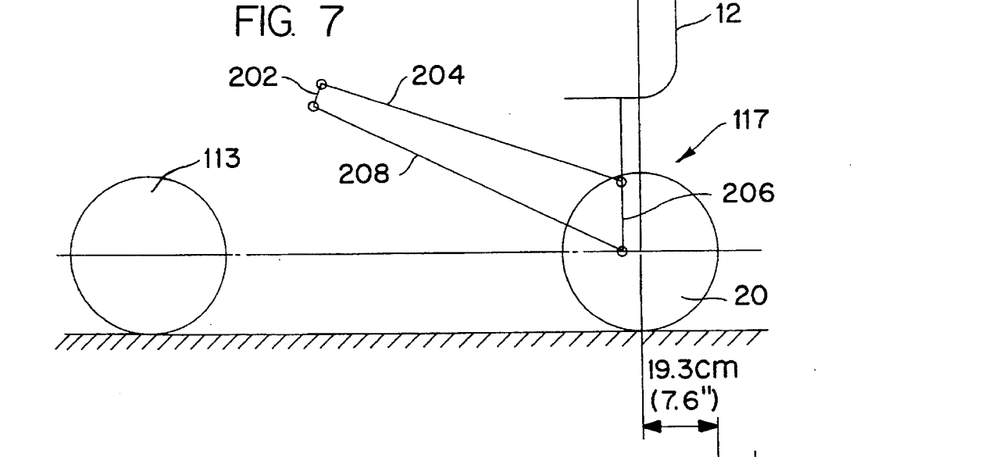
FIG. 7 is a schematic view of the present invention illustrating the seat position of the sulky relative to horizontal when the sulky is on level terrain.
Figure 8:
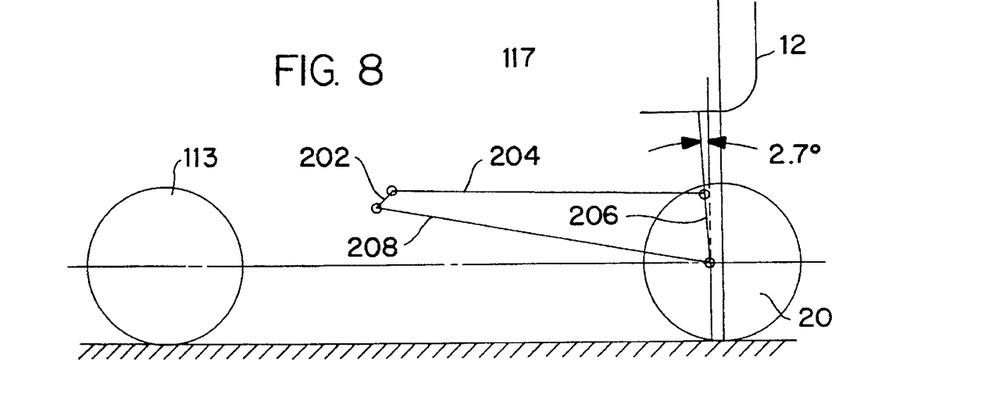
FIG. 8 is a schematic view of the present invention illustrating the seat position of the sulky relative to horizontal when the sulky is pitched forward, by twenty-seven degrees, during the traversing of a ravine.

FIGS. 6–8 schematically illustrate the coupling mechanism for maintaining the seat 12 of the sulky 117 in a substantially horizontal position irrespective of the pitch of the sulky. This coupling mechanism includes the hitch point 202, the upper support member 204, the support member 206 secured to the platform 11 and the lower support member 208 as described above. FIG. 6 illustrates the seat 12 in a position relative to the horizontal when the sulky is pitched backward by 20 degrees during the cresting of a hill. The seat is deflected relative to the horizontal by only 0.9 degrees. Similarly, a backward pitch angle of 7 degrees only causes a 0.5 degree deviation from the horizontal. FIG. 7 illustrates the seat 12 in a position when the sulky 117 is disposed on level terrain. The wheel 20 of the sulky 117 as illustrated in FIG. 6 is displaced forward by 22.86 centimeters or 9.0 inches during the cresting of a hill as compared to the positioning of the wheel 20 as illustrated in FIG. 7. Thus, during the cresting of a hill with the sulky 117 of the present invention, an operator is positioned closer to the control handles of the motorized vehicle so that the control handles are disposed in a convenient position relative to the operator.

If the sulky 117 is pitched forward by 16 degrees, the seat 12 is maintained in a horizontal position with a zero degree inclination. Thus, the seat 12 is maintained substantially horizontal through the entire pitch range of the sulky.

FIG. 8 illustrates the seat 12 in a position relative to the horizontal when the sulky is rotated by 27 degrees during the traversing of a ravine. The seat is deflected relative to the horizontal by only 2.7 degrees. The wheel 20 of the sulky 117 as illustrated in FIG. 8 is displaced away from the motorized vehicle by 19.3 centimeters or 7.6 inches during the traversing of a ravine as compared to the positioning of the wheel 20 as illustrated in FIG. 7. Thus, during the traversing of a ravine with the sulky 117 of the present invention, an operator is positioned in a convenient position relative to the control handles of the motorized vehicle.

The lengths of each link can be determined through kinematics wherein the amount of angular deflection of the seat and the height of the sulky bracket 7 are predetermined values.

Figure 11:
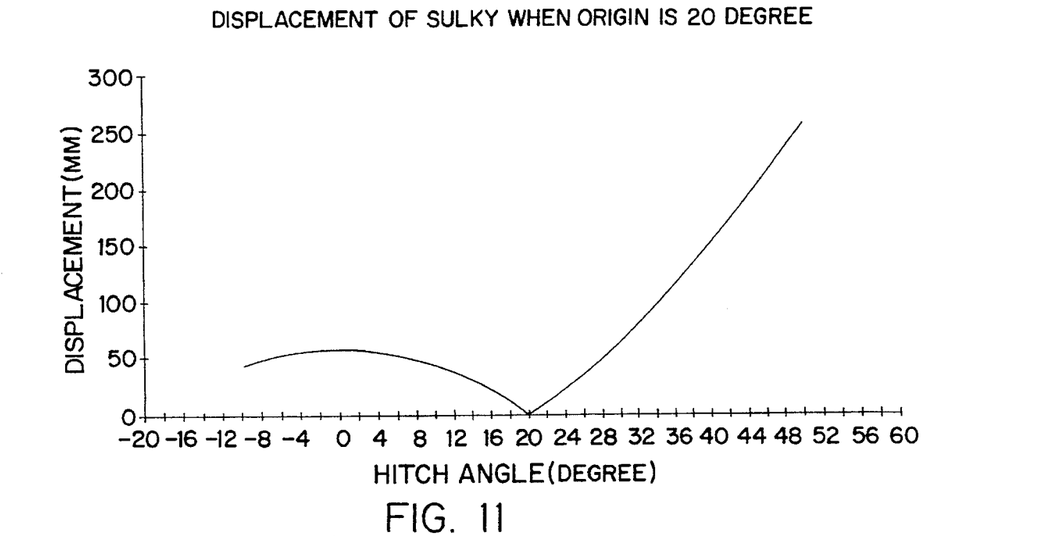
FIG. 11 is a graph illustrating the displacement of the sulky when the original hitch angle is twenty degrees.
Figure 12:
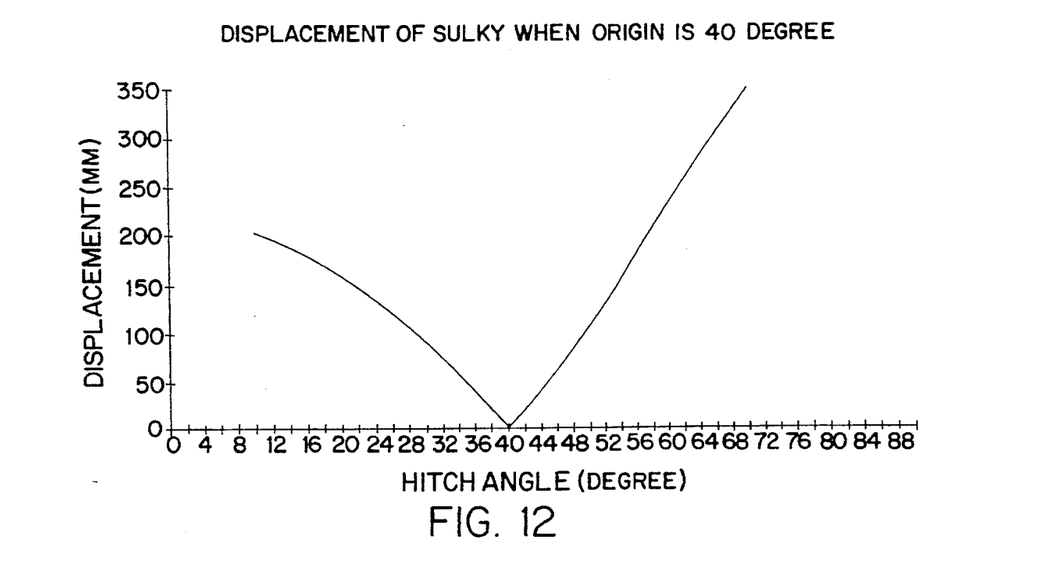
FIG. 12 is a graph illustrating the displacement of the sulky when the original hitch angle is forty degrees.
Figure 13:
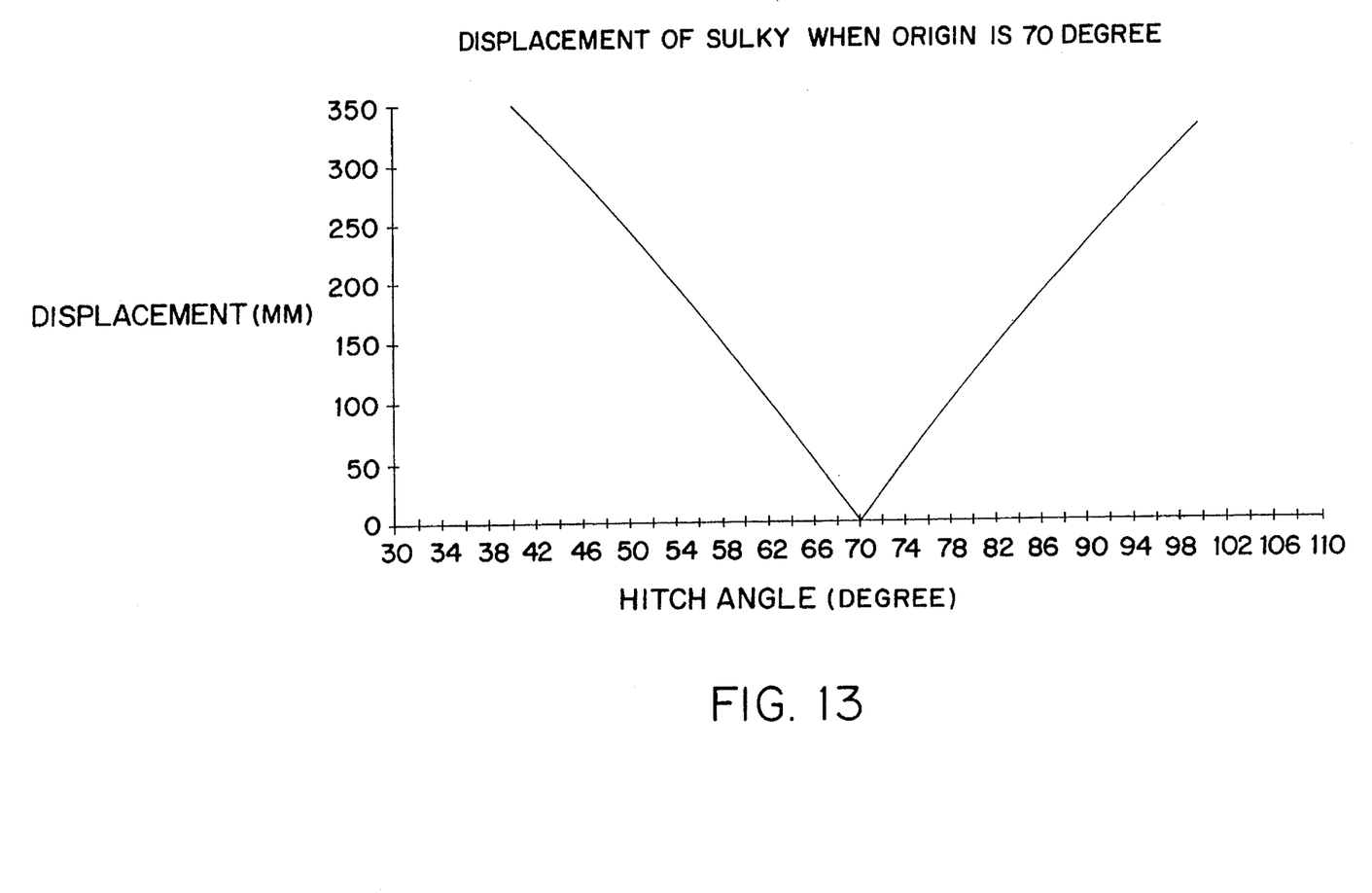
FIG. 13 is a graph illustrating the displacement of the sulky when the original hitch angle is seventy degrees.

FIGS. 11, 12 and 13 are graphs illustrating the displacement of the sulky 117 relative to the motorized vehicle 110 when the original hitch point angle is twenty, forty and seventy degrees, respectively, derived from a horizontal line drawn through the axis of the wheels of the sulky 117 and the motorized vehicle.

The operating range criteria for a sulky 117 connected to the motorized vehicle 110, such as a commercial mower, is plus or minus thirty degrees. Thus, the angular movement of the sulky 117 relative to the motorized vehicle 110 would be plus or minus thirty degrees from the original hitch point angle. No direction to the displacement is set forth in FIGS. 11, 12 and 13. The displacement set forth in the graphs is the raw displacement based on an absolute value.

As illustrated in FIG. 11, when the hitch point angle is twenty degrees, and the sulky 117 is in a neutral position, the displacement of the sulky 117 relative to the motorized vehicle 110 is zero. In other words, no additional displacement occurs between the sulky 117 and the motorized vehicle 110 when the sulky 117 is on level terrain. As the sulky 117 and the motorized vehicle 110 traverse a ravine, as illustrated to the left of the neutral twenty degree point in FIG. 11, the displacement between the sulky 117 and the motorized vehicle 110 gradually increases and then proceeds to slightly decrease until the operating range of minus thirty degrees from the original twenty degree hitch point angle is reached. The displacement of the sulky 117 from the motorized vehicle 110 is always a positive number as the hitch angle is varied from twenty degrees to a negative ten degrees.

As the sulky 117 and the motorized vehicle 110 crest a hill, as illustrated to the right of the neutral twenty degree point in FIG. 11, the displacement between the sulky 117 and the motorized vehicle 110 gradually increases until the operating range of plus thirty degrees from the original twenty degree hitch point angle is reached. The displacement of the sulky 117 from the motorized vehicle 110 is always a positive number as the hitch angle is varied from twenty degrees to fifty degrees.

As illustrated in FIG. 12, when the hitch point angle is forty degrees, and the sulky 117 is in a neutral position, the displacement of the sulky 117 relative to the motorized vehicle 110 is zero. In other words, no additional displacement occurs between the sulky 117 and the motorized vehicle 110 when the sulky 117 is on level terrain. As the sulky 117 and the motorized vehicle 110 traverse a ravine, as illustrated to the left of the neutral forty degree point in FIG. 12, the displacement between the sulky 117 and the motorized vehicle 110 gradually increases until the operating range of minus thirty degrees from the original forty degree hitch point angle is reached. The displacement of the sulky 117 from the motorized vehicle 110 is always a positive number as the hitch angle is varied from forty degrees to ten degrees.

As the sulky 117 and the motorized vehicle 110 crest a hill, as illustrated to the right of the neutral forty degree point in FIG. 12, the displacement between the sulky 117 and the motorized vehicle 110 gradually increases until the operating range of plus thirty degrees from the original forty degree hitch point angle is reached. The displacement of the sulky 117 from the motorized vehicle 110 is always a positive number as the hitch angle is varied from forty degrees to seventy degrees.

As illustrated in FIG. 13, when the hitch point angle is seventy degrees, and the sulky 117 is in a neutral position, the displacement of the sulky 117 relative to the motorized vehicle 110 is zero. In other words, no additional displacement occurs between the sulky 117 and the motorized vehicle 110 when the sulky 117 is on level terrain. As the sulky 117 and the motorized vehicle 110 traverse a ravine, as illustrated to the left of the neutral seventy degree point in FIG. 13, the displacement between the sulky 117 and the motorized vehicle 110 gradually increases until the operating range of minus thirty degrees from the original seventy degree hitch point angle is reached. The displacement of the sulky 117 from the motorized vehicle 110 is always a positive number as the hitch angle is varied from seventy degrees to forty degrees.

As the sulky 117 and the motorized vehicle 110 crest a hill, as illustrated to the right of the neutral seventy degree point in FIG. 13, the displacement between the sulky 117 and the motorized vehicle 110 gradually increases until the operating range of plus thirty degrees from the original seventy degree hitch point angle is reached. The displacement of the sulky 117 from the motorized vehicle 110 is always a positive number as the hitch angle is varied from seventy degrees to one hundred degrees.

Figure 9:
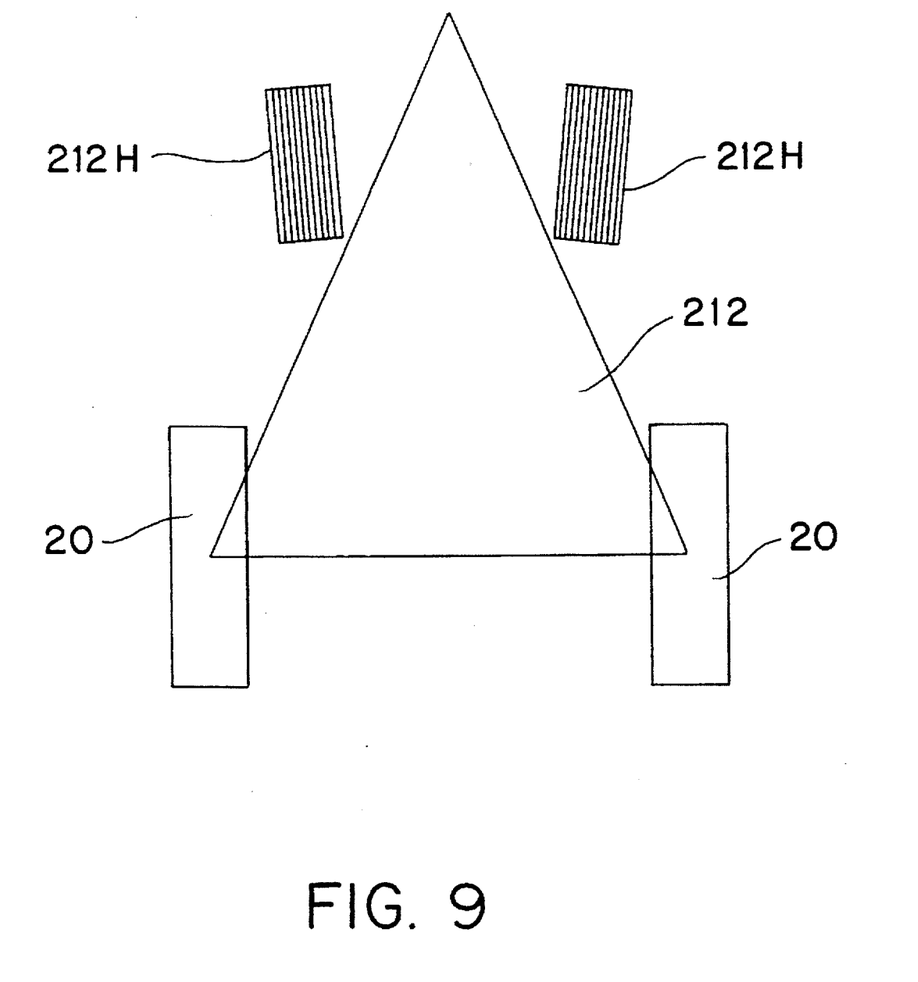
FIG. 9 schematically illustrates the positioning of an operator's feet outside the triangle of the platform.

FIG. 9 schematically illustrates the lateral stability of the present invention achieved by positioning an operator's feet outside the triangle of the platform 212. The pivot assemblies formed by the connection of the upper support member 204 to the hitch point 202 and the support member 206, the pivot assemblies formed by the connection of the lower support member 208 to the hitch point 202 and the support member 206 and the attachment of the hitch point 202 to the bracket 200 limit the maximum vertical displacement of a single wheel 20 of the sulky 117 to 10.67 centimeters or 4.2 inches (or 7 degrees). The primary limiting means is the connection between the bracket 200 and the hitch point 202. This allowable roll is significantly less than the approximately 25.4 centimeters or 10 inches of vertical displacement (15.5 degrees) permitted by a hitch assembly for a conventional sulky.

This relatively small vertical displacement of the sulky 117 will permit the operator of the sulky 117 to be in a proper position during use. In addition, even when the motorized vehicle is exiting from a zero turn the sulky will have a feeling of stability. The hitch point of the sulky 117 does permit sufficient flexibility so that the sulky 117 may properly track uneven ground without adversely affecting the cutting performance of the mower.

Referring to FIGS. 2 and 9, a platform 212 is secured to the bottom of the lower support member 208 by means of the support 210. The platform 212 has two footrests 212H. The stability of the sulky 117 may be maintained if the sulky begins to lean to one side by locating the footrests 212H outside of the stability triangle. This allows the operator to compensate for any lateral instability by applying a force to the footrest 212H which creates a moment sufficient to overcome the roll permitted by the hitch point. The placement of the footrests outside of the stability triangle is also arranged in this manner with regard to three wheel all-terrain vehicles (ATVs).

Figure 10:
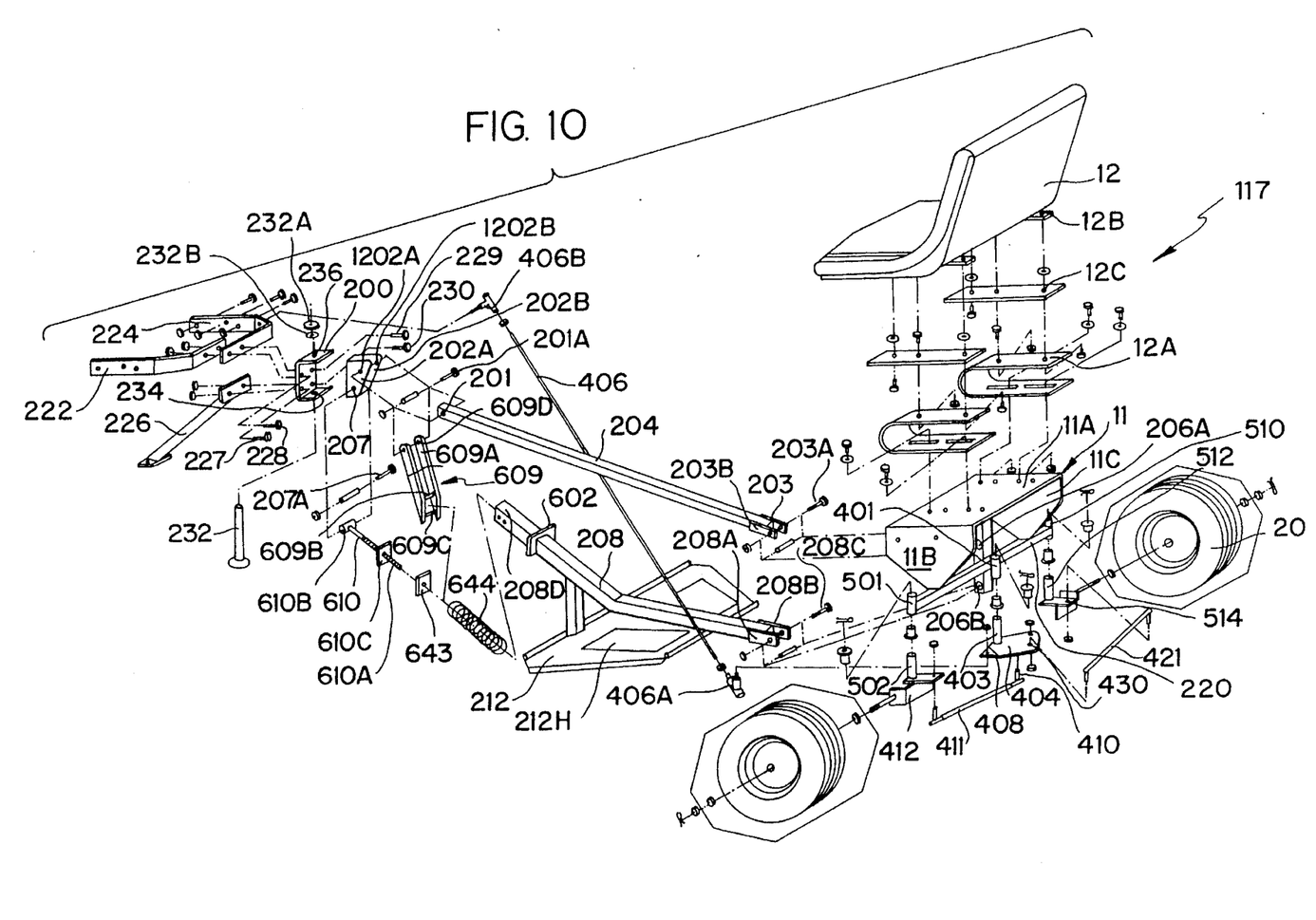
FIG. 10 is an exploded view of a sulky mounting structure according to a second embodiment of the present invention.

An alternate embodiment of the coupling mechanism is illustrated in FIG. 10. Like parts are identified by the same designation as in the embodiment of FIG. 2. The lower support member 208 is connected to an adjustable linkage member 610 and a resilient member 644 for biasing the lower support member 208 relative to the hitch point 202. A generally rectangular collar 602 is secured adjacent to a end of the lower support member 208. A connecting member 609 includes two spaced plates 609A connected at one end by two spacers 609B and 609C. An arcuate hole 609D is formed at the other end of the connecting member 609 in each of the plates 609A. The arc of each hole 609D has its center located at the hole 1202A of the hitch point 202. The adjustable linkage member 610 includes a threaded portion 610A with the helical compression spring 644 being positioned thereof. The adjustable linkage member 610 is secured to a hollow cylindrical head 610B which extends perpendicular from one end thereof. A collar 610C is secured along the length of the adjustable linkage member 610. An end 208D of the lower support member 208 is inserted inside the coils of the spring 644 so that the spring 644 abuts the collar 602. A nut 643 which includes a rectangular flange is threaded onto the adjustable linkage member 610. The connecting member 609 is disposed between one end of the spring 644 and the nut 643. The adjustable linkage member 610 is inserted inside the coils of the spring 644 so that the spacers 609B and 609C are sandwiched between the nut 643 and the spring 644.

The upper support member 204 and the connecting member 609 are pivotally connected to the hitch point 202 via the apertures 1202A, 201 and 609D by means of the sleeve, bolt and nut assembly 201A. The adjustable linkage member 610 pivots about a sleeve, bolt and nut assembly 207A inserted in the apertures 207 and an aperture in the hollow cylindrical head 610B.

The amount of pre-compression of the spring 644 should be sufficient to prevent the front of the two-wheel tractor 110 from suddenly tilting up due to terrain or an operator induced force. The precompression of the spring 644 is set at about 1000 lb. in a preferred embodiment. However, this prestress of the spring 644 may be varied to compensate for changes in the ride height of the mower or tire pressure of the drive wheels. The pre-compression of the spring 644 may be adjusted by simply rotating the adjustable linkage member 610 via the hollow cylindrical member 610B. This provides a large moment arm so that the compression of the spring 644 is not labor intensive. Alternatively, the pre-compression may be adjusted by turning the nut 643.

This embodiment of the coupling mechanism negates forward or backward pitching of the sulky 117 induced by the operator and the seat location. The spring 644 can absorb the force of an operator standing on the platform 212 or pushing down on the control handles 214 of the two-wheel tractor 110 so that the sulky 117 does not pitch forward. Tension in the spring 644 causes an upward force to be exerted on the two-wheel tractor 110 thereby eliminating the operator induced forward pitch of the sulky 117. This allows a force to be applied by the operator to increase traction of the drive wheels 113 of the two-wheel tractor 110 without causing the sulky 117 to pitch forward.

The lower support member 208 will also prevent the operator's weight from pitching the sulky 117 backwards. The upward force from the sulky 117 compresses the spring 644. This causes the spring 644 to exert a downward force on the two-wheel tractor 110 which counters the upward force of the sulky 117. The spring 644 has no effect on the function of the coupling mechanism for maintaining a level seat position.

The hitch point 202 includes apertures 207 and 1202A. The hitch point 202 pushes the seat away from the two-wheel tractor 110 when the sulky 117 pitches forward. The knees of an operator positioned on the sulky 117 will be in a convenient position relative to the control handles 114 of the two-wheel tractor 110 when the two-wheel tractor 110 is inclined and executes a zero turn. Conversely, the location of the hitch point 202 will draw the seat toward the two-wheel tractor 110 as the sulky pitches backward to ensure that the control handles 114 remain within the normal reach of the operator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sulky having a support platform including a seat for an operator secured thereto, at least one wheel operatively rotatably connected to said support platform, and a coupling mechanism for operatively connecting said sulky to a motorized vehicle, said coupling mechanism comprising:

a hitch point adapted to be connected to a motorized vehicle;

an upper support member having a first end pivotally connected to said hitch point at a first connection point and a distal end extending a predetermined distance therefrom and being pivotally connected to said support platform; and a lower support member having a first end pivotally connected to said support platform and a distal end extending towards and being pivotally connected to said hitch point at a second connection point;

said hitch point, upper support member and lower support member being operatively connected together for adjusting the disposition of a sulky relative to a motorized vehicle during the traversing of a crest in terrain and a ravine in terrain.

2. The sulky according to claim 1, wherein the hitch point, upper support member and lower support member are operatively connected together for adjusting the tilting of the seat relative to a horizontal plane when said sulky is disposed at a predetermined angle relative to said horizontal plane.

3. The sulky according to claim 1, and further including a support member affixed to said support platform of said sulky, said distal end of said upper support member and the first end of said lower support member being pivotally mounted relative to said support member.

4. The sulky according to claim 1, and further including a platform secured to said lower support member for positioning an operator's feet during use of said sulky, said platform being provided to enable an operator to compensate for any lateral instability by applying a force thereto during use.

5. The sulky according to claim 1, wherein said hitch point is disposed a predetermined distance above a horizontal center line of said at least one wheel of said sulky.

6. The sulky according to claim 5, wherein an angle of between approximately 20 and 70 degrees is formed between said center line and one of said connection points on said hitch point.

7. The sulky according to claim 6, wherein said angle is approximately 39.4 degrees.

8. The sulky according to claim 5, wherein said hitch point includes a first aperture for pivotally mounting the first end of said upper support member and a second aperture spaced from said first aperture for pivotally mounting the distal end of said lower support member.

9. The sulky according to claim 1, and further including biasing means for biasing said lower support member relative to said hitch point.

10. The sulky according to claim 9, wherein said biasing means includes adjusting means for adjusting the tension exerted between the lower support member and said hitch point.

11. The sulky according to claim 9, wherein said lower support member includes a collar secured relative thereto, said biasing means including a spring mounted on said lower support member and being in engagement with said collar, an adjustable linkage member being secured to said hitch point and being operatively disposed relative to said spring for adjusting the tension exerted between the lower support member and said hitch point.

12. The sulky according to claim 11, and further including a connecting member pivotally mounted relative to said hitch point and being operatively mounted relative to said spring and said distal end of said lower support member.

13. A lawnmower comprising:

a motorized vehicle including two drive wheels;

a motor for driving said drive wheels;

control means for controlling the operation of said motorized vehicle;

a sulky including a support platform and being operatively connected to said motorized vehicle;

a hitch point adapted to be connected to the motorized vehicle;

an upper support member having a first end pivotally connected to said hitch point at a first connection point and a distal end extending a predetermined distance therefrom and being pivotally connected to said support platform;

a lower support member having a first end pivotally connected to said support platform and a distal end extending towards and being pivotally connected to said hitch point at a second connection point;

said hitch point permitting said sulky to articulate about a vertical axis extending through said hitch point, pitch about a transverse horizontal axis containing one of said connection points, and roll about a longitudinal horizontal axis that contains said hitch point, said transverse horizontal axis containing one of said connection points being angularly displaced from a horizontal plane passing through the center of said drive wheels by an angle of at least 20 degrees.

14. The lawnmower according to claim 13, wherein said hitch point limits the amount of roll of the sulky relative to said motorized vehicle to less than 25.4 centimeters of vertical displacement of a wheel of said sulky.

15. The lawnmower according to claim 13, wherein said hitch point limits the amount of roll of the sulky relative to said motorized vehicle to less than 15.5 degrees.

16. The lawnmower according to claim 13, wherein said angle is approximately 39.4 degrees.

17. The lawnmower according to claim 13, and further including a platform secured to said lower support member for positioning an operator's feet during use of said sulky, said platform being provided to enable an operator to compensate for any lateral instability by applying a force thereto during use.

* * * * *